United States Patent [19]
Tatsuzawa

[11] 3,723,653
[45] Mar. 27, 1973

[54] TELEVISION TELEPHONE SYSTEM

[75] Inventor: Yoshinobu Tatsuzawa, Kyoto, Japan

[73] Assignee: Matsushita Electric Industrial Co., Ltd., Osaka, Japan

[22] Filed: Oct. 21, 1968

[21] Appl. No.: 769,051

[30] Foreign Application Priority Data

| | | |
|---|---|---|
| Oct. 24, 1967 | Japan | 42/69116 |
| Dec. 28, 1967 | Japan | 42/79 |
| Dec. 28, 1967 | Japan | 42/81 |
| Jan. 26, 1968 | Japan | 43/4728 |
| May 30, 1968 | Japan | 43/37420 |
| Aug. 8, 1968 | Japan | 43/56894 |

[52] U.S. Cl. ....179/2 TV, 179/1 CN
[51] Int. Cl. ....H04m 11/08
[58] Field of Search ..179/2 TV; 178/6.8, 7, DIG. 13; 325/50

[56] References Cited

UNITED STATES PATENTS

| | | | |
|---|---|---|---|
| 3,530,251 | 9/1970 | Miyawaki | 179/2 TV |
| 3,519,744 | 8/1970 | Dorros et al. | 179/2 TV |
| 3,463,879 | 8/1969 | Miyashiro | 178/6.8 |
| 3,482,040 | 12/1969 | Brinster | 178/6.8 |
| 3,263,027 | 7/1966 | Beltrami | 178/6.8 |
| 3,061,670 | 10/1962 | Oster | 178/6.8 |
| 2,922,843 | 1/1960 | Clark | 178/6.8 |
| 2,909,600 | 10/1959 | Becker | 178/6.8 |
| 2,895,005 | 7/1959 | Kock | 178/5.6 |
| 2,878,310 | 3/1959 | Becker | 178/6 |
| 2,314,471 | 3/1943 | Wright | 178/5.6 |
| 2,017,883 | 10/1935 | Zworykin | 178/6 |
| 2,420,198 | 5/1947 | Rosenthal | 178/6.8 |
| 3,524,023 | 8/1970 | Whang | 179/2 DP |

FOREIGN PATENTS OR APPLICATIONS

| | | | |
|---|---|---|---|
| 121,146 | 11/1958 | U.S.S.R. | 178/DIG. 7 |

*Primary Examiner*—Kathleen H. Claffy
*Assistant Examiner*—Thomas D'Amico
*Attorney*—Stevens, Davis, Miller & Mosher

[57] ABSTRACT

A television telephone system, wherein frequency-modulation with a low modulation index is effected by using a carrier wave of a slightly higher frequency than the maximum frequency of a video signal, and the video signal thus modulated is transmitted through a transmission line. With such system, a wide band video signal and audio signal can be transmitted without cross talk and distortion by using an ordinary telephone cable which is intended to be used only for the transmission of voice frequency signals, and communication can be achieved, with the image of the opposite party or drawing, document or the like being viewed.

3 Claims, 10 Drawing Figures

INVENTOR
YOSHINOBU TATSUZAWA

BY Stevens, Davis, Miller & Mosher
ATTORNEYS

INVENTOR
YOSHINOBU TATSUZAWA
BY
ATTORNEYS

INVENTOR
YOSHINOBU TATSUZAWA

BY

ATTORNEYS

INVENTOR

YOSHINOBU TATSUZAWA

BY

ATTORNEYS

TELEVISION TELEPHONE SYSTEM

This invention relates to a television telephone system, and more particularly it pertains to such system wherein frequency-modulation with a low modulation index is effected by using a carrier wave of a slightly higher frequency than the maximum frequency of a video signal, and the video signal thus modulated is transmitted through a transmission line.

It is a primary object of the present invention to make it possible to transmit wide band video signals without distortion through an ordinary telephone line which is of poor frequency characteristic or intended only for the transmission of the voice frequency signal.

Another object of the present invention is to provide a two-wire television telephone system and also a conference television telephone system utilizing such two-wire television telephone system.

A further object of the present invention is to provide a six-wire television telephone system and also a conference television telephone system utilizing such six-wire television telephone system.

A still further object of the present invention is to provide a pick-up device for documents or the like which is suited to the present television telephone system.

Other objects, features and advantages of the present invention will become apparent from the following description taken in conjunction with the accompanying drawings, in which.

Figure 1:
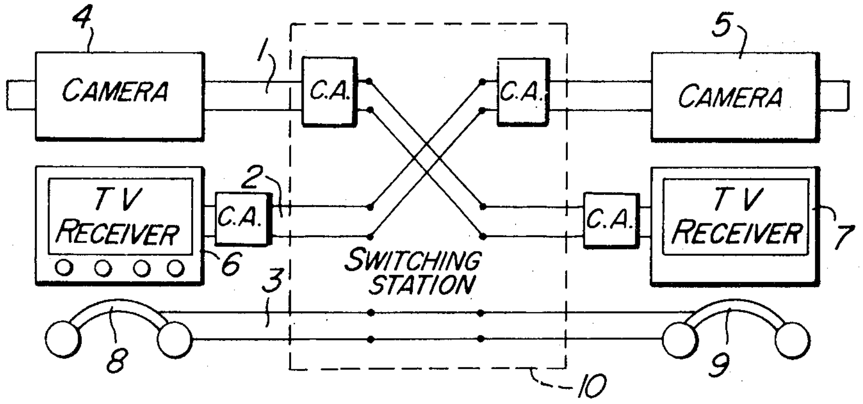
FIG. 1 is a block diagram showing the conventional television telephone system.

Referring to FIG. 1, there is shown the conventional television telephone system, which requires two pairs of wide band transmission lines 1 and 2 such as coaxial cables or high-quality telephone cables and several compensation amplifiers through which video signals are directly transmitted, and there is provided a voice channel 3 similar to that in the ordinary telephone system. Such conventional system is designed so that either a picture of high resolution such as about 3 MHz or a picture of a narrow band such as about 500 KHz might be transmitted depending upon the characteristic of the wide band transmission lines and the compensation amplifiers. The reference numerals 4 and 5 represent cameras, 6 and 7 television receivers, 8 and 9 telephone instruments, and 10 an exchange. However, the conventional system described above is disadvantageous in the facts that the coaxial cables to be used are expensive and the use of such a narrow band as about 500 KHz results in unsatisfactory picture quality. Furthermore, special compensation amplifiers are required for compensating the line characteristics in the case of long distance transmission.

An attempt has heretofore been made to transmit wide band video signals by compressing them to a narrow band, but such attempt has not yet been put to practical use since high-quality pictures cannot be reproduced even by using expensive sophisticated apparatus.

Description will now be made of the television telephone system according to the present invention.

Figure 2:
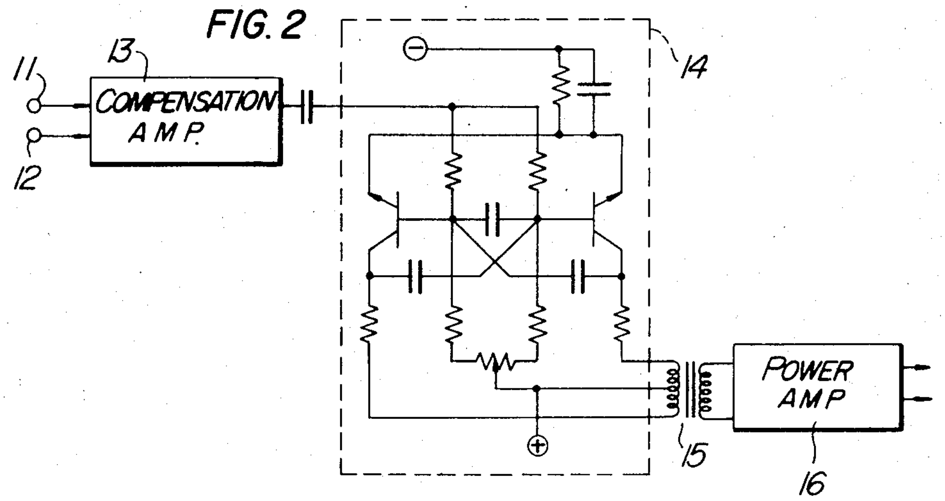
FIG. 2 is a circuit diagram showing a modulator circuit which is employed in the television telephone system according to the present invention for modulating wide band video signals.

Referring to FIG. 2, there is shown a wide band video signal modulating circuit which is used in the present system. Assume that the maximum frequency of a video signal is 3 MHz for example, then a carrier wave frequency is to be set slightly higher than the maximum frequency, e.g., 4 MHz.

The carrier wave is frequency-modulated by a video signal with a shallow frequency deviation (frequency deviation of 800 KHz, for example).

There are available two alternative methods for performing such frequency-modulation. That is, one of those methods is to produce oscillation at about 4 MHz by means of an oscillator such as an astable multivibrator and directly change the oscillation frequency by changing the parameters of the oscillator circuit in accordance with a video signal, and the other method is to frequency-modulate the oscillated signal of a high frequency produced by an oscillator using a reactance tube, variable capacitance diode or the like with a video signal, and then beat-down the modulated signal by mixing the latter with the output of a separate oscillator adapted to produce oscillation at a frequency close to that of the said oscillator. FIG. 2 shows a circuit utilizing the first-mentioned method, wherein the reference numerals 11 and 12 represent video signal input terminals, 13 a compensation amplifier, 14 an astable multivibrator, 15 an output transformer, and 16 a power amplifier.

Figure 3:
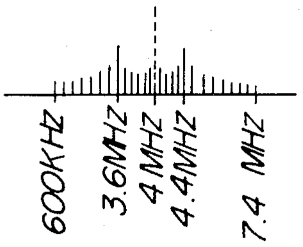
FIG. 3 shows the spectra of a signal modulated by the modulating circuit shown in FIG. 2.

The substantial part of the spectra of the modulated signal obtained in the above manner cover between about 600 KHz and 7.4 MHz, as shown in FIG. 3.

Figure 4:
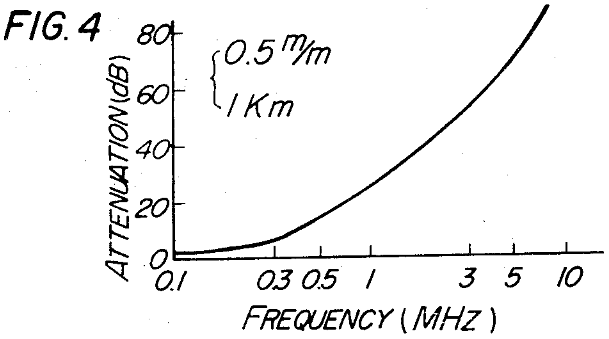
FIG. 4 is a view showing the frequency characteristic of an ordinary telephone line.

As shown in FIG. 4, the frequency characteristic of an ordinary telephone line is such that at about 4.5 MHz, the attenuation over a distance of about 1 km is about 50 to 60 dB and much greater attenuation occurs in the case of a longer distance.

If a video signal having been transmitted through such line is amplified by about 50–60 dB and then passed through an amplitude limiter, then the upper side band wave is partially lost, but the lower side band wave and carrier wave are completely reproduced. By passing the video signal through a discriminator subsequently, the lower frequency components thereof are directly demodulated without distortion, since both side band waves are transmitted. The higher frequency components are demodulated to have an amplitude half that of the original signal, because of the non-linear circuit of the amplitude limiter (in this case, the amplitude of the lower side band wave is also reduced to half). This relationship approximately holds true only in the case where the modulation index is relatively low. Fortunately, from a practical standpoint distortion can be substantially neglected, since the amplitude of the higher frequency component of a video signal is generally low so that the modulation index thereof is also low. Further, by previously emphasizing the higher frequency component to make the amplitude thereof twice as great as the original value in the modulator circuit, the amplitude of the demodulation output can be made substantially uniform.

Figure 5:
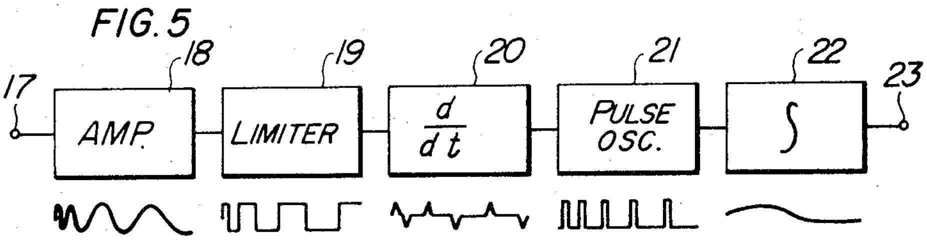
FIG. 5 is a block diagram showing a demodulating circuit which can be employed in the present television telephone system.

The non-uniformity of the frequency characteristic of a transmission line (telephone line) is eliminated by an amplitude limiter incorporated in the receiver, so that demodulated video signals are substantially not influenced thereby. It is useful to facilitate the amplitude limitation by suppressing the lower frequency component to a certain degree at the transmission output side and emphasizing the higher frequency component in the receiving amplifier. An example of a demodulator circuit is shown in FIG. 5, wherein the reference numeral 17 represents an input terminal, 18 an amplifier with 50 dB of gain, 19 a limiting amplifier (limiter), 20 a differentiating circuit, 21 a pulse generator, 22 an integrating circuit, and 23 a video signal output terminal. A signal amplified by the amplifier 18 is converted to a rectangular wave by the limiter 19, and then differentiated by the differentiating circuit 20, the output of which is used as a triggering signal to control the pulse generator in order to produce constant-amplitude pulses, which are in turn integrated for demodulation. Another method is to effect demodulation by beating up a signal to a higher frequency and then passing it through an ordinary discriminator. Such a video signal transmission method has the following features:

1. In the case of the foregoing example, the spectral frequency band below 600 KHz is unoccupied so that other types of signals such as voice signal, dial tone, control signal, facsimile signal, data signal and so forth can be simultaneously transmitted through the common line while being superimposed upon a video signal.
2. Low-frequency induction noise or the like has no effect on the picture quality.
3. The contrast of a reproduced picture is not varied with a change of level occuring depending upon the transmission distance.
4. The contrast remains unchanged irrespective of level change stemming from the simultaneous connection of a multiplicity of receivers.
5. The picture quality remains unchanged irrespective of variations in the line characteristics with temperature variations.
6. The repeating amplifier can be simplified since the frequency characteristic is not critical.

Figure 6:
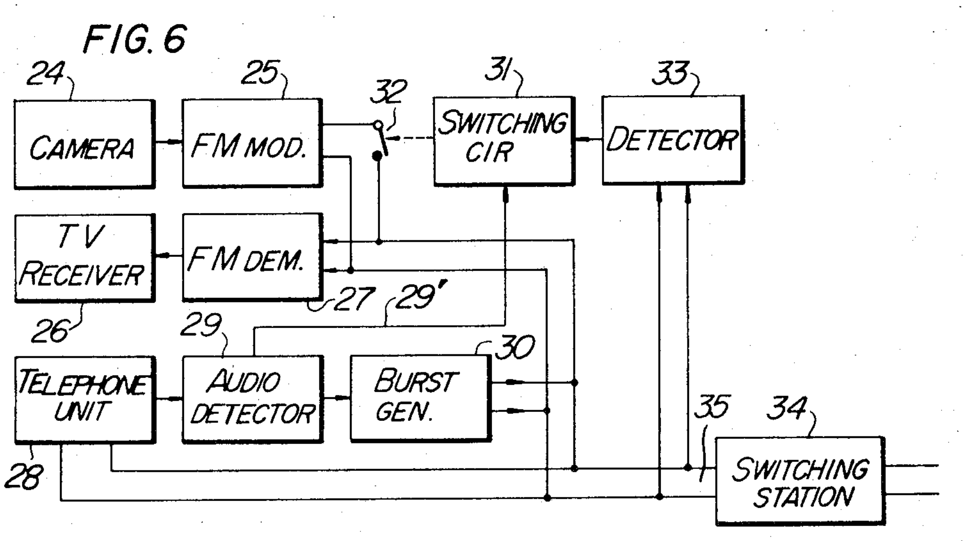
FIG. 6 is a block diagram showing the two-wire television telephone system according to the present invention.

Description will now be made of the two-wire television telephone system using the aforementioned modulation system, the concrete arrangement of which is as shown in FIG. 6, wherein the reference numeral 24 represents a camera, 25 a frequency-modulator connected with the camera 24, 26 a television receiver, 27 a frequency-demodulator for the receiver 26, 28 a telephone instrument, 29 a voice detector for detecting a voice signal occurring in the telephone instrument 28, 30 a burst generator for generating a burst signal of e.g., 30 KHz, 31 a switching circuit for controlling the switching operation of a switch 32, and 33 a detector circuit for detecting the burst signal of the said 30 KHz contained in a signal from an exchange 34 and controlling said switching circuit 31 to turn off in accordance with the detection signal. A signal entering the switching circuit 31 through a line 29' restrains the circuit 31 from being operated by a signal resulting from the detection of the output of the burst generator 30 by the burst detector, and it also serves to turn on the switch 32 when the latter is in the "off" state. Individual subscribers are connected with each other through two-wire telephone cable 35 as the case with the ordinary telephone system.

Voice and dial signals from the telephone instrument 28 are directly supplied to the exchange 34 as usual, and video signal representing an image picked up by the camera 24 is modulated by the FM modulator 25 in the aforementioned manner and then superimposed upon the voice signal. Such video signal is transmitted only in one direction under the action of the switch 32. That is, the design is made such that the image of a speaker appears on the television receiver 26 of the other party when he speaks. At that time, the switch 32 in the speaker's apparatus is turned on, while the switch 32 in the other party's apparatus is turned off. That is, a voice signal is rectified and integrated in the voice detector 29 to produce a triggering signal at the beginning of a phrase, so that a tone burst durable for about 100 miliseconds (the frequency is 30 KHz, for example) is generated by the burst generator 30. This tone burst is transmitted to the other party so that the output of the video modulator in the other party's apparatus is cut off while the output of the video modulator 25 in the speaker's apparatus is turned on. In this case, the switching circuit 31 in the speaker's apparatus is inhibited. Consequently, the speaker is viewed on the other party's receiver until the other party speaks. With such arrangement, it is possible to achieve the purpose of television telephone substantially satisfactorily.

In an attempt to utilize the present system as conference system, the intended purpose can be achieved merely by connecting a plurality of subscribers in parallel with each other. In this case, the image of a speaker is simultaneously viewed on all the television receivers, and upon alternation of speaker, the image viewed on the respective receivers is changed at the same time. Of cource, the voice can be communicated to all the parties.

In either case, when a speaker takes off the receiver, a triggering signal is generated due to the shock of the power source so that the change-over switch 32 in the speaker's apparatus is turned on, when powers are supplied to the camera 24 and television receiver 26. Thus, the image of the speaker is viewed on this receiver. (In this case, the filaments in the camera 24 and television receiver 26 are pre-heated by weak power when the circuit is cut off.) When the other party responds to the dialing of the telephone instrument 28, trigger and tone burst are produced due to the shock of the power source in the other party's apparatus, so that the image viewed on the screen is changed to that of the other party. Subsequent alternation of image is effected by voice signal.

Figure 7:
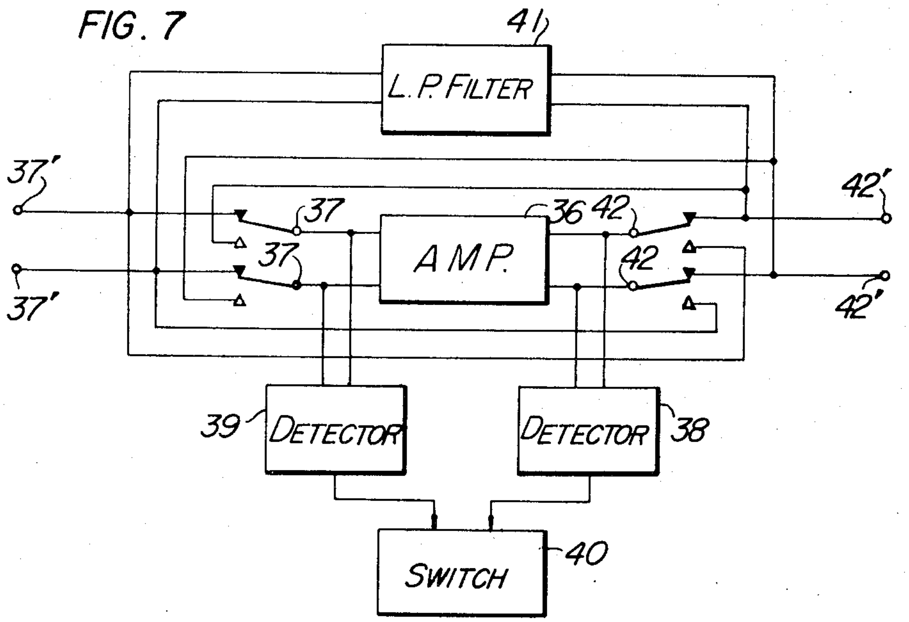
FIG. 7 is a circuit diagram showing a repeating amplifier to be used for long distance transmission in the present two-wire television telephone system.

In the case of a two-wire system, repeating amplifiers are inserted to achieve long distance transmission. In such case, however, it is necessary that the directionality of the input and output terminals of the repeating amplifiers be switched in correspondence with the direction of the video signal transmission. This can be achieved by discriminating the in-coming direction of the 30 KHz tone burst by means of a direction discriminator. FIG. 7 shows the circuit arrangement of a repeater including such direction discriminator, wherein amplifier 36 is so designed as to amplify only the frequency band above 30 KHz. When the 30 KHz tone burst arrives from the output terminals 42', 42 of the amplifier 36, the 30 KHz detector 38 provides an output while the other 30 KHz detector 39 provides no output. At this point, the switching circuit 40 is quickly operated to reverse the polarity of the amplifier 36 and connect the terminals 37' and 42' with the terminals 42 and 37 respectively. When the 30 KHz signal is detected at the terminals of the 30 KHz detectors 38 and 39, the switching circuit 40 is prevented from being operated. Further, voice and dial signals are not passed through the amplifier 36 but by-passed through a 4 KHz low-pass filter 41.

Next, description will be made of the six-wire television telephone system according to the present invention, which is advantageous in the fact that the image of the opposite party can be viewed irrespective of the speaker.

Figure 8:
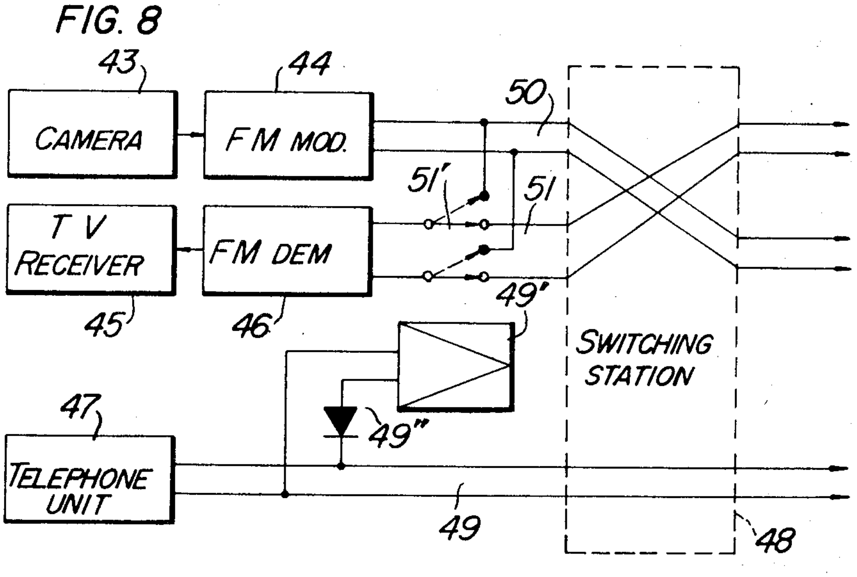
FIG. 8 is a block diagram showing the six-wire television telephone system according to the present invention.

The concrete arrangement of such system is as shown in FIG. 8, wherein the reference numeral 43 represents a camera, 44 an FM modulator, 45 a television receiver, and 46 an FM demodulator. With this arrangement, too, the aforementioned modulation and demodulation are effected. The reference numeral 47 denotes a telephone instrument, 48 an exhcnage, and 49' a switching circuit. A voice channel 49, transmission channel 50 and reception channel 51 are independently provided, and therefore six wires are needed.

Such six-wire system has such advantages that near-end cross talk can be reduced by separately bundling the transmission lines and reception lines and there is no need to switch the repeating amplifier.

By maintaining under −30 dB cross talk level between transmission and reception signals, it is possible to obtain sufficient practical S/N ratio. Such a value can easily be realized by designing the transmission line in such a manner as to improve the degree of balance of installation thereof.

Figure 9:
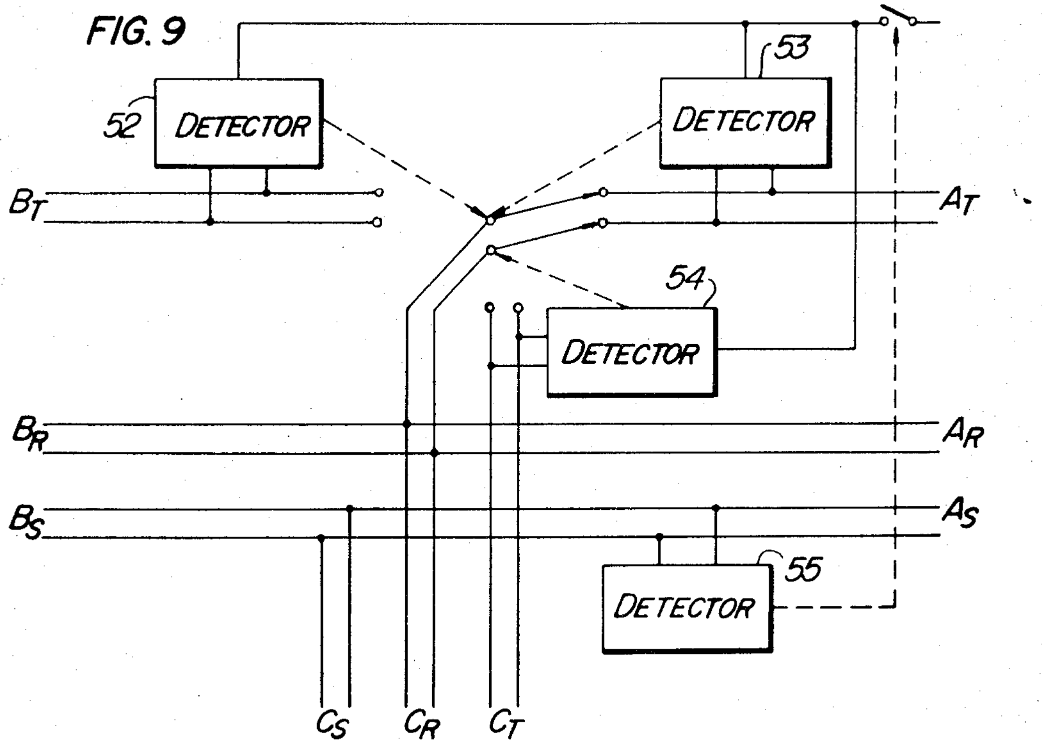
FIG. 9 is a circuit diagram showing the system of FIG. 8 as being constructed in the form of conference system.

FIG. 9 shows an arrangement for achieving conference communications in accordance with the six-wire system, wherein A, B and C represent the respective subscriber stations, with the suffix T indicating video transmission, R video reception and S sound. The voice line and video reception line are connected in parallel with each other. A video transmission line is connected with a video reception line by selecting one circuit associated with a caller in the exchange. That is, in each of the subscriber stations A, B and C, a tone burst of 30 KHz for example is produced by detecting the beginning of a word so as to be transmitted to the video transmission line. Upon detection of such tone burst, the exchange connects only one circuit and disconnects all the other circuits. The reference numerals 52, 53, 54 and 55 denote 30 KHz detectors respectively. The broken arrows show the control systems.

It may sometimes be desired that the voice switching operation be interrupted and that the same image be continuously viewed. This can be achieved by continuously sending a 30 KHz tone signal to the voice circuit (or video receiver circuit). In the exchange, such tone signal is detected, and the voice switching circuit is cut off, so that the present connection is maintained. The circuit arrangement needed to achieve this purpose is also shown in FIG. 9. That is, the above function is achieved by 30 KHz detector 55.

In both cases of the aforementioned bilateral communications and conference communications, when the handset is taken off at one station, the image of the caller is first viewed, but when the dialing operation is completed and the opposite party responds to the call, the image is changed to that of the called party. To this end, the exchange is afforded such a function as to reverse the polarity of the power source connected with the voice circuit when connection is made. At each terminal, the polarity of the voice circuit is detected to change the connection, so that the image of the caller initially viewed is changed to that of the opposite party. That is, diode 49'' is controlled to be rendered conductive or non-conductive in accordance with the polarity of the power source for the voice circuit 49, so that the operation of the change-over circuit 49' such for example as a relay is controlled to thereby control the change-over of a switch 51', as shown in FIG. 8.

For conference communications,one 30 KHz tone burst is produced simultaneously with a "hook-off" in order that the images of conference participators may be successively viewed by all of them. A concrete circuit arrangement for achieving such purpose will readily become apparent to those skilled in the art. Preferably, the heaters of cameras and TV tubes are pre-heated to cause an image to be quickly viewed by turning on the power source concurrently with the "-hook-off". At each equipment, the image can freely be changed to the image of the subscriber, as desired.

Description will now be made of means for viewing documents, drawings and so forth in the television telephone system.

Figure 10:
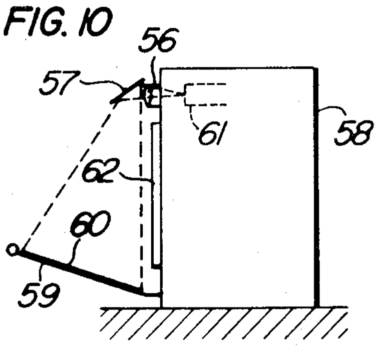
FIG. 10 is a schematic view showing a television telephone instrument which can be used in the present television telephone system.

As shown in FIG. 10, removable mirror 57 is mounted in front of a camera lens 56 at an angle of about 45° with respect to the optical axis of the lens. In case the image of a man or figure is to be viewed, the mirror 57 is accommodated in a casing 58, and in case a document is to be viewed, the mirror 57 is taken out so that the image of document 60 placed on a lower plate 59 is reflected by the mirror so as to be projected onto a camera 61. In this case, the viewed image of the document 60 tends to be bilaterally reversed. Therefore, the scanning direction of the pick-up tube 61 is also reversed in interlocking relationship with the operation of taking out the mirror 57.

Furthermore, the focal distance differs between the case where a document is viewed and the case where a figure is viewed, and therefore the focus of the camera 61 is adjusted in interlocking relationship with the operation of taking out the mirror, so that the focal point is located at the plate 59.

From the standpoint of television telephone instrument design, a difficulty is often encountered in taking out the mirror to position the mirror so that it is located above the center of a document as shown in FIG. 10. Thus, there is a tendency that the viewed image of a document placed on a desk is enlarged at the bottom or distorted to be trapezoidal. Such trapezoidal distortion can be corrected by inclining the document plate 59 as shown in FIG. 10. The reference numeral 62 represents a picture tube.

What is claimed is:

1. A television-telephone system, comprising, in combination: a conventional telephone transmission line having a narrow band transmission characteristic; means for generating a video signal; means for generating a carrier wave signal having a higher frequency than the maximum frequency of said video signal and having a frequency such that the upper side band portion thereof is substantially the only portion of said carrier wave which is not transmittable through said transmission line; means for frequency modulating said carrier wave by said video signal with a low index of modulation; means for transmitting said modulated carrier wave through said transmission line, except for said upper side band portion; frequency demodulating means for demodulating said transmitted modulated carrier wave; means connecting voice and video reception lines of at least three television-telephone instruments in parallel with each other; means generating a tone burst signal and transmitting same through said transmission line; means connected to said video transmission and reception lines for detecting said tone burst signal; and means for preventing the switching of said video signal by the generation of said tone burst signal by a voice signal, said preventing means including means generating a continuous tone, whereby said video signal is transmitted through and reproduced from said conventional narrow band telephone transmission line.

2. A television-telephone system, comprising, in combination: a conventional telephone transmission line having a narrow band transmission characteristic; means for generating a video signal; means for generating a carrier wave signal having a higher frequency than the maximum frequency of said video signal and having a frequency such that the upper side band portion thereof is substantially the only portion of said carrier wave which is not transmittable through said transmission line; means for frequency modulating said carrier wave by said video signal with a low index of modulation; means for transmitting said modulated carrier wave through said transmission line, except for said upper side band portion; frequency demodulating means for demodulating said transmitted modulated carrier wave; means to reverse polarity at the transmitting and receiving stations of said system upon completion of a polarity connection of a D.C. power source supplied from an exchange to a voice line; means to view the image of a calling party prior to the completion of said connection; and means to thereafter view the image of a called party, whereby said video signal is transmitted through and reproduced from said conventional narrow band telephone transmission line.

3. A television-telephone system, comprising, in combination: a conventional telephone transmission line having a narrow band transmission characteristic; means for generating a video signal; means for generating a carrier wave signal having a higher frequency than the maximum frequency of said video signal and having a frequency such that the upper side band portion thereof is substantially the only portion of said carrier wave which is not transmittable through said transmission line; means for frequency modulating said carrier wave by said video signal with a low index of modulation; means for transmitting said modulated carrier wave through said transmission line, except for said upper side band portion; frequency demodulating means for demodulating said transmitted modulated carrier wave; separate two-wire telephone cables for each of two directions of transmission and reception of said video information and a further two-wire line for said voice signal; means to reverse polarity at the transmitting and receiving stations of said system upon completion of a polarity connection to a D.C. power source supplied from an exchange to a voice line; means to view the image of a calling party prior to the completion of said connection; and means to thereafter view the image of a called party, whereby said video signal is transmitted through and reproduced from said conventional narrow band telephone transmission line.

* * * * *